United States Patent
Vardi et al.

(10) Patent No.: US 11,627,723 B2
(45) Date of Patent: Apr. 18, 2023

(54) SLOW RELEASE FLEA AND TICK COLLAR

(71) Applicant: SOLANO S.P. LTD., Ram On (IL)

(72) Inventors: Amnon Vardi, Ram On (IL); Nimrod Vardi, Ram On (IL); Omer Vardi, Ram On (IL); Amir Kafri, Ram On (IL)

(73) Assignee: SOLANO S.P. LTD., Ram On (IL)

( * ) Notice: Subject to any disclaimer, the term of this patent is extended or adjusted under 35 U.S.C. 154(b) by 0 days.

(21) Appl. No.: 17/624,105

(22) PCT Filed: Jul. 9, 2020

(86) PCT No.: PCT/IL2020/050771
§ 371 (c)(1),
(2) Date: Dec. 30, 2021

(87) PCT Pub. No.: WO2021/005606
PCT Pub. Date: Jan. 14, 2021

(65) Prior Publication Data
US 2022/0201984 A1    Jun. 30, 2022

Related U.S. Application Data

(60) Provisional application No. 62/871,745, filed on Jul. 9, 2019.

(51) Int. Cl.
A01K 27/00 (2006.01)
A01N 25/10 (2006.01)

(52) U.S. Cl.
CPC ............ A01K 27/007 (2013.01); A01N 25/10 (2013.01)

(58) Field of Classification Search
CPC ...... A01N 25/10; A01K 27/007; A01K 27/00; A01K 27/001; A01K 27/0002; A61D 7/00
See application file for complete search history.

(56) References Cited

U.S. PATENT DOCUMENTS

| 5,411,737 | A | 5/1995 | Hsu | |
|---|---|---|---|---|
| 6,372,242 | B1* | 4/2002 | Gutierrez | A01N 25/34 514/579 |
| 7,910,122 | B2* | 3/2011 | Sirinyan | A01N 51/00 424/405 |
| 9,622,478 | B2* | 4/2017 | Vardi | A01N 51/00 |
| 2004/0202690 | A1* | 10/2004 | Arther | A61P 5/36 424/411 |
| 2008/0245315 | A1* | 10/2008 | Tyler | A01K 27/007 119/654 |
| 2013/0251773 | A1* | 9/2013 | Galiatsatos | A01N 25/34 424/409 |
| 2015/0257388 | A1* | 9/2015 | Vardi | A01N 51/00 514/471 |

FOREIGN PATENT DOCUMENTS

| EP | 0090446 | 10/1983 |
|---|---|---|
| WO | 0187065 | 11/2001 |
| WO | 2014060960 | 4/2014 |

OTHER PUBLICATIONS

International Search Report and Written Opinion dated Sep. 13, 2020 for PCT International Application PCT/L2020/050771 filed on Jul. 9, 2020.
International Preliminary Report on Patentability dated Aug. 24, 2021 for PCT International Application PCT/L2020/050771 filed on Jul. 9, 2020.

* cited by examiner

*Primary Examiner* — Kristen C Hayes
(74) *Attorney, Agent, or Firm* — JMB Davis Ben-David

(57) ABSTRACT

An extended-release plastic matrix formulation (PMF-ExR) comprising a polyethylene-comprising polymer, a plasticizer, and at least one insecticide as active components is described. The PMF-ExR may be used in the manufacture of a wearable device for treating ectoparasitic infestations.

14 Claims, No Drawings

SLOW RELEASE FLEA AND TICK COLLAR

RELATED APPLICATIONS

This application is a US National Phase of PCT Application No. PCT/IL2020/050771, filed on Jul. 9, 2020 which claims benefit under 35 U.S.C. 119(e) of U.S. Provisional Application 62/871,745 filed July 9, 2019, the disclosure of which is incorporated herein by reference.

BACKGROUND

Dogs, cats and other household pets may become infested by ectoparasites (surface dwelling parasites) known as fleas and ticks. Common fleas which affect pets include the cat flea (*Ctenocephalides felis*) and the dog flea (*Ctenocephalides canis*). Fleas tend to feed on the blood of pets causing discomfort to the animal. Fleas may also bite humans, causing irritation and potentially causing allergic reactions. *Rhipicephalus sanguineus*, the brown dog tick, is a tick commonly found on dogs in a household setting. It has been implicated in causing disease in dogs, including babesiosis and ehrlichiosis and in humans including Rocky Mountain spotted fever.

SUMMARY

An aspect of the disclosure relates to an extended-release plastic matrix formulation (PMF-ExR) comprising insecticides as active components and a combination of plastic and plasticizer formulated for extended release of the active components.

Certain embodiments of PMF-ExR as disclosed herein have improved characteristics relative to previously known compositions including sustained activity against both fleas and ticks, no irritation to treated animals and long-lasting effect even after treated animals are bathed.

Throughout the specification the term "slow release" refers to a relatively slow release of the active components from within the PMF to an external surface of the PMF, and/or a sustained effect of the active components against fleas and ticks over an extended period of time. Optionally, slow release refers to effective release of the active components over a time period of more than a month, more than six weeks, more than two months, about six months, or more than six months. The term "slow release" may be used interchangeably herein with "extended-release" or "sustained-release".

In an embodiment of the disclosure, a PMF-ExR comprises a polyethylene (PE)-comprising polymer as a base plastic matrix, a plasticizer as a release-modifying additive, and dinotefuran and flumethrin as active components. Optionally, the active components comprise dinotefuran formulated to be between 10% and 15% of the total formulation by weight and flumethrin formulated to be between 2% and 5% of the total formulation by weight, and a plasticizer formulated to be between 2% and 7% of the total formulation by weight. The plasticizer may be a primary plasticizer or a secondary plasticizer.

Another aspect of the disclosure relates to a PFM-ExR animal collar comprising a PFM-ExR that is configured to be in contact with the fur of an animal wearing the collar. Optionally, the collar is a PFM-ExR that is extruded or molded in the shape of a collar.

Another aspect of the disclosure relates to methods of treating a mammal, which may be a non-human mammal, by way of example a dog or a cat, suffering from flea and/or tick infestation, the method comprising attaching a PFM-ExR to the animal. Optionally, attaching the PFM-ExR to the animal comprises having the mammal wear an appropriately shaped and dimensioned PFM-ExR animal collar. Optionally, the PFM-ExR animal collar is replaced once a month.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Formulations and methods of treatment for the fight against ectoparasites is a constant necessity both for animals and for humans in their surroundings. The present disclosure provides novel formulations, embedded in plastic, which have proved to be significantly effective against ectoparasites.

The preparation of an extended-release plastic matrix formulation (PMF-ExR) requires finding a balance between all of its components (plastic and insecticide) in order to obtain a product that has on one hand elastomer properties, and on the other hand is able to release the active ingredients (the insecticides) at a relatively slow rate for long-lasting efficacy. In general, many of the wearable devices currently available in the market release of the insecticides occurs at relatively fast rate so as to not be long-lasting. The present technology provides a PMF that has both the elasticity necessary for molding a wearable device such as a collar as well as a balanced chemical composition capable of retaining insecticide to a degree sufficient for slow release without preventing release entirely.

Various plastics and combinations were tested for arriving at PMF-ExRs that was characterized by one or more of: appropriate elasticity that allowed it to be molded into a wearable device; appropriate hydrophobicity that provided a stable medium for the insecticides to stay in the matrix and not undergo hydrolysis or leach out upon contact of the wearable device with water; and a melting point between not higher than 200° C. in order to avoid inactivation of the insecticide compounds during production.

An aspect of the disclosure relates to an extended-release plastic matrix formulation (PMF-ExR) comprising a combination of a plastic matrix, a plasticizer, and insecticides as active components, the PMF being formulated for extended release of the active components.

In an embodiment of the disclosure, the plastic matrix comprises a structural polymer comprising one or more of a flexible polymer or an elastomer with viscoelastic properties, with the structural polymer being hydrophobic and non-toxic for extended periods of external contact on a skin of an animal or a human.

Optionally, the structural polymer comprises a polyolefin. The polyolefin may be a polyethylene (PE) or a polypropylene (PP). A PE-comprising structural polymer may comprise a high-density polyethylene (HDPE; defined as having a density of 0.93 g/cm$^3$ to 0.97 g/cm$^3$), a low-density polyethylene (LDPE defined as having a density of 0.91 g/cm$^3$ to 0.93 g/cm$^3$), a linear low-density polyethylene (LLDPE), a PE-based polyolefin elastomer ("POE"), or combinations thereof. A LDPE has more branching (on about 2% of the carbon atoms) than HDPE, so that its intermolecular forces are weaker and its tensile strength is lower. An LLDPE is a substantially linear polyethylene polymer comprising short branches, typically made by copolymerization of ethylene with chains of alpha-olefins such as butene, hexene, or octene. A PE-based POE is a copolymer of ethylene and another alpha-olefin (which maybe be referred in the context of POE formulations as a "comonomer") such as butene or octene. POEs, including PE-based POE's are typically produced using a metallocene catalyst, and its physical properties can be tuned based on the selection and content of the comonomer(s) respective to ethylene. Higher comonomer content tends to produce a POE with higher elasticity due to the comonomer incorporation disrupting polyethylene crystallinity. POEs typically bridge the gap between traditional elastomers and thermoplastics. Commercial examples of PE-based POEs include ENGAGE™ Polyolefin Elastomers (Dow) and TAFMER™, Polyolefin Elastomers (Mitsui Chemicals) and Lucene™ (LG Chemical).

The PE-comprising polymer may comprise or consist of a combination of a PE-based POE and a LDPE.

Optionally, the structural polymer comprises a polyurethane, which may be a thermoplastic polyurethane (TPU). Optionally, the structural polymer comprises an unsaturated and/or saturated rubber, by way of example an ethylene propylene rubber (EPR), an ethylene propylene diene rubber (EPDM), a silicone rubber, an ethylene-vinyl acetate (EVA), a thermoplastic polyurethane (TPU), a styrene-butadiene rubber (SBR), and the like.

Optionally, a structural polymer comprised in a PFM-ExR is considered to be hydrophobic if characterized by a "contact angle" of larger than 90 degrees, as exhibited by a drop of water on a flat, solid surface of the structural polymer.

As noted herein above, the extended-release plastic formulation (PMF-ExR) provided in the disclosure may comprise a plasticizer. Optionally, the plasticizer is a primary plasticizer or a secondary plasticizer.

Plasticizers (softeners) are softening substances that reduce the intensity of intermolecular interaction and increase the mobility of polymer chains, thereby increasing flexibility of a polymer to which it is added. Plasticizers are typically used to control physical properties of polymers comprising polyvinylchloride (PVC), and are categorized as primary or secondary plasticizers based on their solvation properties and compatibility with PVC. Primary plasticizers are compatible with PVC, contain polar groups, and are characterized by high solvation capabilities. Secondary plasticizers have insufficient affinity for PVC for it to be the sole plasticizer and tend to be used as part of a blend with a primary plasticizer rather than used alone. A secondary plasticizer is also known in the art as an "extender plasticizer", for its properties of enhancing the plasticizing effect of a primary plasticizer. Compounds that serve as secondary plasticizers typically contain functional groups that are less polar than primary plasticizers and demonstrate limited solubility and compatibility with PVC. Examples of secondary plasticizers include aliphatic, aromatic, and chlorinated hydrocarbons (such as chlorinated paraffins) as well as epoxy esters of unsaturated fatty acids obtained from plants (by way of example epoxidized butyl and n-hexyl esters of unsaturated fatty acids).

Whereas PVC-comprising polymers typically have their physical properties such as softness and flexibility controlled with primary and/or secondary plasticizers, plasticizers are known in the art to be incompatible for formulation with PE-comprising polymers. Unlike PVC-comprising polymers that tend to form stable formulations with primary and secondary plasticizers, PE-comprising polymers tend to be inhospitable to plasticizers. Instead of forming stable formulations as in PVC-comprising polymers, both primary and secondary plasticizers tend to be unstable within in PE-comprising polymers and leach out. Moreover, plasticizers are relatively ineffective in controlling the physical properties of PE-comprising polymers. However, it was surprisingly found that incorporation of a PVC plasticizer to a PE-comprising structural polymer was effective in providing an extended-release capability to the structural polymer for insecticides incorporated therein. For convenience of presentation, the plasticizer comprised in a PMF-ExR in accordance with an embodiment of the disclosure may be referred to as a "release-modifying additive".

A primary plasticizer comprised in a of an embodiment the disclosure may be a dioctyl terephthalate (DOTP), a diisononyl phthalate (DINP a triacetin, a benzoate ester, a trimethyl pentanyl diisobutyrate (TXIB), or a propylene carbonate. The benzoate ester may be a 1,2-Propanediol, 1,2-dibenzoate or a 2-ethylhexyl benzoate. A secondary plasticizer comprised in a PMF-ExR of an embodiment the disclosure may be a chlorinated paraffin, a naphtenic hydrocarbon, an aliphatic hydrocarbon), or an epoxidized triglyceride. The epoxidized triglyceride may be an epoxidized plant-derived oil such as epoxidized forms of one or a combination of two or more of: a soybean oil (ESBO), a palm oil, a canola oil, a linseed oil, a sunflower oil, a rapeseed oil, a cocoa butter, a olive oil, or a rice bran oil, amongst others.

The present inventors surprisingly found that a formulation comprising a matrix plastic as described herein, such as a polyethylene and/or a POE, in combination with a plasticizer, provides satisfactory conditions for synthesizing and molding a wearable device for slow release of insecticides, at a rate of release that is well-suited for anti-ectoparasitic application.

Insecticides comprised in the PMF-ExR described herein may be any one of dinotefuran, flumethrin, indoxacarb, Imidacloprid, Amitraz, or any combination thereof.

Dinotefuran, also known by the chemical name 2-methyl-1-nitro-3-[(tetrahydro-3-furanyl)-methyl] guanidine, is a nicotinic acetylcholine receptor inhibitor which acts by disrupting the nervous systems of insects. Dinotefuran-comprising compositions have been disclosed in publication WO 2014/060960, incorporated herein by reference.

In an embodiment of the disclosure the PMF-ExR described herein comprises dinotefuran formulated to be about 10%, about 10.5%, about 11%, about 11.5%, about 12%, about 12.5%, about 13%, about 13.5%, about 14%, about 14.5%, or about 15% of the total formulation weight (TFW). In this regard, the plastic matrix formulation provided herein may comprise dinotefuran in a range of 10%-15%, 10%-14.5%, 10%-14%, 10%-13.5%, 10%-13%, 10%-12.5%, 10%-12%, 10%-11.5%, 10%-11%, 11%-15%, 11.5%-15%, 12%-15%, 12.5%-15%, 13%-15%, 13.5%-15% and 14%-15%.

Flumethrin, also known by the chemical name cyano(4-fluoro-3-phenoxyphenyl) methyl 3-[2-chloro-2-(4-chlorophenyl)ethenyl]-2,2-dimethylcyclopropanecarboxylate, is a pyrethroid insecticide.

In an embodiment of the disclosure a PMF-ExR described herein comprises flumethrin formulated to be about 2%, about 2.5%, about 3%, about 3.5%, about 4%, about 4.5%, or about 5% of the TFW. In this regard, the plastic matrix formulation provided herein may comprise flumethrin in a range of 2%-5%, 2%-4.5%, 2%-4%, 2%-3.5%, 2%-3%, 2%-2.5%, 2.25%-5%, 2.5%-5%, 2.75%-5%, 3%-5%, 3.25%-5%, 3.5%-5%, 3.75%-5%, 4%-5%, 4.25%-5%, 4.5%-5% and 4.75%-5%.

In an embodiment of the disclosure a PMF-ExR described herein comprises a combination of dinotefuran and flumethrin (D+F) formulated to be about 14%, or about 13.5%, or about 13%, or about 12.5%, or about 12% dinotefuran of the TFW, in combination with about 4% flumethrin of the TFW. Alternatively, a PMF-ExR described herein comprises D+F formulated to be about 12.5% dinotefuran of the TFW, in combination with about 4%, or about 3.5%, or about 3% of flumethrin of the TFW. Optionally, the ratio by weight of dinotefuran to flumethrin in a PMF-ExR is between 5:1 and 2:1, or between 4:1 and 3:1.

In an embodiment of the disclosure an PMF-ExR described herein comprises indoxacarb formulated to be about 9%, about 9.5%, about 10%, about 10.5%, about 11%, about 11.5%, about 12%, about 12.5%, about 13%, about 13.5%, about 14%, about 14.5%, or about 15% of the TFW. In this regard, the plastic matrix formulation provided herein may comprise indoxacarb in a range of 9%-15%, 9%-14.5%, 9%-14%, 9%-13.5%, 9%-13%, 9%-12.5%, 9%-12%, 9%-11.5%, 10%-11%, 11%-15%, 11.5%-15%, 12%-15%, 12.5%-15%, 13%-15%, 13.5%-15% and 14%-15%.

In an embodiment of the disclosure an PMF-ExR described herein comprises imidacloprid formulated to be about 4%, about 4.5%, about 5%, about 5.5%, about 6%, about 7.5%, about 8%, about 8.5%, about 9%, about 9.5%, or about 10% of the TFW. In this regard, the plastic matrix formulation provided herein may comprise imidacloprid in a range of 4%-10%, 4%-9.5%, 4%-9%, 4%-8.5%, 4%-8%, 4%-7.5%, 4%-7%, 4%-6.5%, 4%-6%, 5%-10%, 5.5%-10%, 6%-10%, 6.5%-10%, 7%-10%, 7.5%-10%, 8%-10%, 8.5%-10%, 9%-10% and 9.5%-10%.

Unless specifically stated or obvious from context, as used herein, the term "about" is understood as within a range of normal tolerance in the art, for example within 2 (two) standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein can be modified by the term about.

In an embodiment of the disclosure, a PMF-ExR comprises a PE-comprising polymer as a hydrophobic plastic matrix, a combination of dinotefuran and flumethrin as active components, and an epoxidized triglyceride as a plasticizer. Optionally, the PE-comprising polymer comprises a PE-based POE or a combination of a PE-based POE and a LDPE. The epoxidized triglyceride, by way of example ESBO, in the formulation may be about 2%, about 2.5%, about 3%, about 3.5%, about 4%, about 4.5%, about 5%, about 5.5%, about 6%, about 6.5%, or about 7%, of the TFW. In this regard, the plastic matrix formulation provided herein may comprise the epoxidized triglyceride in a range of 2%-7%, 2%-6.5%, 2%-6%, 2%-5.5%, 2%-5%, 2%-4.5%, 2%-4%, 2.5%-7%, 3%-7%, 3.5%-7%, 4%-7%, 4.5%-7%, 5%-7%, 5.5%-7% and 6%-7%. Optionally the epoxidized triglyceride is an epoxidized plant-derived oil. Optionally, the epoxidized plant-derived oil is an ESBO.

Ranges provided herein are understood to be shorthand for all of the values within the range.

In an embodiment of the disclosure, a PFM-ExR releases the insecticide, by way of example a combination of dinotefuran and flumethrin, at least at a given minimum release rate over a given duration. A duration during which the PFM releases the insecticide or combination of insecticides at least at a given minimum rate may be referred to herein as an "effective release duration". Optionally, the effective release duration is about 1 week, about 2 weeks, about 4 weeks, about 6 weeks, about 2 months, about 3 months, about 4 months, about 5 months, about 6 months, over 9 months or up to a year. Optionally, the minimum release rate of dinotefuran and flumethrin in a PFM-ExR described herein is a rate that is sufficient to treat flea or tick infestation in an animal wearing a collar or other wearable device comprising the PFM-ExR.

The present disclosure demonstrates that it is possible to produce a plastic matrix which in one hand is moldable, and it is suitable to injection in a molding machine, while at the same time retaining insecticide (by avoiding its quick hydrolysis as well as avoiding quick release) to a degree appropriate for slow release of the insecticide. By way of example, such a plastic matrix may be any one of the following combinations: a PE-comprising polymer and paraffin oil, a PE-comprising polymer and ESBO, a PE-comprising polymer and ESBO+DOTP, EVA and DINP, EVA and paraffin oil. Optionally, the paraffin oil is a chlorinated paraffin oil.

By way of example, the present disclosure provides a PMF-ExR comprising a combination of a plastic, by way of example a PE-comprising polymer, and a plasticizer, by way of example an epoxidized triglyceride, which may function as a release-modifying additive that modulates the release of insecticides, by way of example dinotefuran and flumethrin, from a hydrophobic plastic matrix, such that a clinically significant amount of insecticides is continuously released from the plastic matrix for at least one month, at least two months, at least three months, at least six months, or at least 7 months, or at least 8 months or at least 9 months or at least 10 months.

In an embodiment of the disclosure, a PFM-ExR further comprises additives or medicinal components with any one or any combination of anti-inflammatory, healing, antiseptic, or anti-pruritus activity.

In an embodiment of the disclosure, a PFM-ExR further comprises a volatile oil. The volatile oil may be comprised as a component of an essential oil comprising a mixture of volatile and non-volatile oils. Examples of essential oils are lavender oil, rose oil, lemon grass oil, thyme oil, peppermint oil, and eucalyptus oil.

In an embodiment of the disclosure, a PFM-ExR further comprises a porous material. The porous material may be incorporated in the PMF-ExR as a layer within the formulation or as granules dispersed within the formulation. The porous material optionally comprises one or a combination of two or more selections from the group consisting of: a silica gel, a fumed silica (also known as pyrogenic silica), a diatomite, a carbon black, and an activated carbon. Silica gel is a porous silicon dioxide that is available in a wide variety of grain sizes. Fumed silica consists of microscopic droplets of amorphous silica fused into branched, chainlike, three-dimensional secondary particles which then agglomerate into tertiary particles having a high surface-to-volume ratio and typically having a size of about 5 nm to 50 nm. Diatomite is a naturally occurring fossilized remains of diatoms composed mostly or entirely from silica and is characterized by porosity and high surface area. Diatomite is typically in the form of a powder having a particle size ranging from less than 3 μm to more than 1 mm, but typically 10 to 200 μm. Activated carbon typically consists of charcoal that has been treated with either a combination of heat and pressure, or with strong acid or base followed by carbonization, to make it highly porous. Carbon black is a material produced by the incomplete combustion of heavy petroleum products, which is a form of paracrystalline carbon that has a high surface-area-to-volume ratio, but typically lower than that of activated carbon. Subtypes of carbon black include acetylene black, channel black, furnace black, lamp black and thermal black.

Additionally or alternatively, the porous material comprises a polymer appropriate for use as a structural polymer, which is formed in a porous form using appropriate manufacturing procedures known in the art. The porous polymer may comprise a polyethylene vinyl acetate (PEVA) or a polyolefin by way of example a LDPE. Optionally, the porous polymer is formulated to have a higher melting point compared to the structural polymer used for ERPM 20 so that the pores of the porous polymer are not substantially degraded or eliminated during incorporation into the ERPM, or if the ERPM is formed, for example by injection molding, into wearable apparatus 10.

Granules of the porous material and may be in one or more of a variety of shapes, such as spherical, flattened spherical, cylindrical, or irregular. The granules may have a maximum transverse cross-sectional distance, which may be a diameter for granules that are substantially spherical, of between about 1 nm and about 5 mm. The granules are optionally in the form of a powder, with transverse cross-sectional distance of each granule being between about 1 nm and about 10 microns. Where the granules comprise a porous polymer, the transverse cross-sectional distance of each granule may be between 0.5 mm and 5 mm.

Optionally, one or more insecticides is pre-loaded into the porous material to create an insecticide-impregnated porous material. Optionally, the pre-loading is performed by dissolving the one or more insecticides in an oil and/or a plasticizer, then having the liquid absorbed into the porous material. Optionally, the oil is a volatile oil, and is evaporated away from the porous material to remove the oil and enrich the one or more insecticides within the insecticide-impregnated porous material.

Optionally, insecticide-impregnated porous material is incorporated in to a structural polymer by adding and mixing the insecticide-impregnated porous material into a PFM-ExR precursor mixture comprising structural polymer when the precursor mixture is in a melted state, or combining the insecticide-impregnated porous material into the PFM-ExR precursor mixture then applying heat to from a melted PFM-ExR mixture. The amount of porous material in a PMF-ExR may depend on the particular porous material used, as well as the desired amount of insecticide. Where the porous material is a silica gel, a fumed silica, a diatomite, a carbon black, or an activated carbon, the porous material may be between 0.1% and 1%, between 0.2% and 0.8%, or about 0.5% of the TFW. There the porous material is a porous polymer, the porous material may be between 1% and 10%, between 2% and 8%, or between 3% and 5% of the TFW.

In an aspect, the present disclosure provides a wearable device comprising a PFM-ExR. In an embodiment of the disclosure, the wearable device may be a collar, a ring, an earring, a bracelet, or any other device that may be garbed on the animal. Optionally, the collar is a PFM-ExR that is extruded or molded in the shape of the wearable device.

An aspect the present disclosure provides a method of preparation of a PFM-ExR. A PFM-ExR may be produced as follows. A plasticizer, which tends to be in liquid form at room temperature, is combined with other liquid ingredients (when present) and mixed to be absorbed into a porous material such as fumed silica or other examples provided hereinabove. The other liquid ingredients may include by way of example an insecticide and/or an essential oil. The liquid-impregnated porous material is combined with dry ingredients including component polymers for the plastic matrix as well as optionally an insecticide (when present in dry form) to form a PFM mixture. Sufficient heat is applied to the PFM mixture to place the component polymers of the plastic matrix into a melted state. Optionally, the applied heat is sufficiently low such that the one or more insecticides are not substantially degraded. Optionally, the method further comprises molding, by way of example injection molding, the heated PFM mixture to a desired shape.

An aspect of the present disclosure provides a method of treating an animal suffering from ectoparasite infestation, the method comprising attaching a PFM-ExR as described in the disclosure to the animal. Alternatively, or additionally, the method of treating an animal suffering from an ectoparasite infestation comprises attaching to the animal a wearable device, for example a collar comprising a PFM-ExR as described in the disclosure. By way of example, ectoparasites are fleas, ticks, flies, sand flies, and the like.

In an embodiment of the present disclosure, the PFM-ExR is for treatment of tick and/or flea infestations in a non-human animal, wherein the animal may be any one of a dog, cat, horse, cattle, sheep, goat, ferret, rabbit, rat, mouse, hamster, guinea pig, gerbil, chinchilla, pig, or any domesticated animal. In an embodiment of the present disclosure, the PFM-ExR described in the disclosure is for the treatment of tick and/or flea infestations in humans.

As referred to herein, a method of treatment refers both to a therapeutic method, which remedies a malaise, as well as to a prophylactic method, which prevents a malaise.

Further numbered embodiments of the disclosure are presented below.

1. An extended-release plastic matrix formulation (PMF-ExR) comprising a polyethylene, a morpholine derivative-based solvent blend as plasticizer, and a combination of dinotefuran and flumethrin as active compounds.

2. An extended-release plastic matrix formulation (PMF-ExR) comprising a polyethylene, a propylene carbonate as plasticizer, and a combination of dinotefuran and flumethrin as active compounds.

3. An extended-release plastic matrix formulation (PMF-ExR) comprising a polyethylene, a chlorinated paraffin oil as plasticizer, and a combination of dinotefuran and flumethrin as active compounds.

4. An extended-release plastic matrix formulation (PMF-ExR) comprising a polyethylene, a combination of ESBO and DOTP as plasticizer, and a combination of dinotefuran and flumethrin as active compounds.

5. An extended-release plastic matrix formulation (PMF-ExR) comprising a polyethylene, ESBO as plasticizer, and a combination of dinotefuran and flumethrin as active compounds.

The polyethylene referred to in the numbered embodiments hereinabove may comprise or consist of a PE-based POE, or a combination of a PE-based POE and an LDPE.

EXAMPLES

Example 1: Collar and Insecticide Formulations

The present inventors prepared a series of formulations in the form of a plastic collar.

TABLE 1

Examples of Formulations

| Formulation | Plastic polymer | Plasticizer | Insecticide |
|---|---|---|---|
| I | POE + LDPE | — | D + F |
| II | POE + LDPE | Morpholine derivative-based solvent blend (Armid ® FMPC) | D + F |
| III | POE + LDPE | Propylene Carbonate | 14% D 4% F |
| IV | POE + LDPE | Paraffin oil | 14% D 4% F |
| V | POE + LDPE | 3.8% ESBO 3.3% DOTP | 14% D 4% F |
| VI | EVA | DINP | 14% D 4% F |
| VII | POE + LDPE | Paraffin oil | 5% Imidacloprid and Indoxacarb |
| VIII | POE + LDPE | Paraffin oil | 10% Indoxacarb |
| IX | POE + LDPE | Paraffin oil | 14% Indoxacarb 4.5% F |
| X | POE + LDPE | Chlorinated paraffin oil | 12.5% D 3.5% F |
| XI | POE + LDPE | Paraffin oil | 12.5% D Amitraz |
| XII | POE + LDPE | 5% ESBO | 12.5% D 3.5% F |
| XIII | POE + LDPE | 5% ESBO | 14% D 4% F |

POE = PE-based polyolefin elastomer;
LDPE = Low density polyethylene;
EVA = Ethylene-vinyl acetate;
D = Dinotefuran;
F = Flumethrin;
DOTP = Dioctyl terephthalate;
ESBO = Epoxidized soybean oil; and
DINP = Diisononyl phthalate.
All percentages are expressed as percentage of TFW.

A further additive that was included in each of formulations I-XIII is 0.1-2% by weight of an essential oil, by way of example a lavender oil. Each of formulations I-XIII each comprised 0.1% to 2% fumed silica.

The above-listed PMF-ExR formulations were produced as follows, using the formulations comprising dinotefuran, which comes in powder form, and flumethrin, which comes in liquid form, as examples. Flumethrin was combined with the essential oil and plasticizer (ESBO, chlorinated paraffin oil, or other), and the combined liquid was mixed with and absorbed into the fumed silica to form a liquid-impregnated fumed silica. The liquid-impregnated fumed silica was then mixed with the dry ingredients, PE-based POE, LDPE, and dinotefuran, to for a PMF mixture. The PMF mixture was then heated to melt the PE-based POE and LDPE, the processed by an extruder to form the melted PMF mixture into collars.

More detailed tables of formulations XII and XIII respectively, which were used in extended use efficacy and safety studies as described hereinbelow in Examples 2-5, are provided in Tables 2 and 3, respectively.

TABLE 2

Formulation XII

| Ingredient | Percentage of TFW |
|---|---|
| Structural polymer | |
| LDPE + PE-based POE | Remainder up to 100% |
| Insecticide | |
| Flumethrin | 3.5% |
| Dinotefuran porous granules | 12.5% |
| Fumed silica | 0.5% |
| Oil | |
| Lavender oil | 2% |
| Plasticizer | |
| ESBO | 5% |
| Other | |
| Butylated hydroxytoluene | 0.1% |

TABLE 3

Formuation XII

| Ingredient | Percentage of TFW |
|---|---|
| Structural polymer | |
| LDPE + PE-based POE | Remainder up to 100% |
| Insecticide | |
| Flumethrin | 4% |
| Dinotefuran porous granules | 14% |
| Fumed silica | 0.5% |
| Oil | |
| Lavender oil | 2% |
| Plasticizer | |
| ESBO | 5% |
| Other | |
| Butylated hydroxytoluene | 0.1% |

Example 2: Treatment of Dogs with a PFM-ExR Collar—Efficacy

An efficacy study was conducted in 18 animals (dogs) for over 180 days, 12 experimental animals wore a DF-PFM-ExR collar, produced with PFM-ExR formulation XII as described in Example 1, and 6 control animals wore a placebo collar. All animals (experimental and control) were infested with at least one type of parasite (fleas and/or ticks) at day 0. Experimental animals (all 12) were re-infested at days 30, 60, 90, 120 and 150. All animals (experimental and control) were checked for the presence of parasites after 72 hours (3 days), 14 days, 33 days, 63 days, 93 days, 123 days, 153 days and 180 days.

The results obtained are summarized herein. The experimental animals, wearing the collar, had in average a parasite count of zero (0) parasites throughout the whole experimental period of 180 days. By contrast, all 6 control animals started at day 0 with a range of between 50 to 69 parasites per animal, which continued throughout the whole experimental period, with stochastic increases and decrease within the range.

The efficacy of the PFM-ExR collar did not lessen with time and throughout the experimental period of 180 days it was fully effective. Therefore, it can reasonably be concluded that the DF-PFM-ExR collar will remain effective for a substantially longer amount of time, beyond the 180-day period, and at least up to 240 days and up to a year. There were no adverse reactions presented by any of the animals treated with the PFM-ExR collar. A limited number of animals presented flea dermatitis the day after re-infestation, but the symptoms disappeared on average two days later.

By contrast, all 6 control animals presented parasites at each time-point checked (72 hours, 14 days, 33 days, 63 days, 93 days, 123 days, 153 days and more than 180 days), with a minimum of 15 and a maximum of 86 parasites. Several animals presented flea dermatitis, and some were diagnosed with babesiosis. These maladies were treated with anti-parasitic drugs and/or medications that treated the symptoms.

These experiments were performed in groups of male and female animals of a range of body weight from between 1.5-8 kg, between 8-25 kg and over 25 kg, as well as in young and mature animals. Body weight and fur length did not change throughout the experimental period for both experimental and control groups.

Example 3: Treatment of Dogs with a PFM-ExR Collar—Safety

A safety study was conducted for collars produced using formulation XII as described in Example 1, in 12 animals (dogs) for 30 days. The animals were treated with an increasing amount of active components, provided in the form of one collar on day 1, two collars on day 4, three collars on day 7, four collars on day 10, and five collars on day 13. All animals responded satisfactorily to the increase in active components, and no adverse reaction was observed. Animal weight was between 1.9-26.4 kg, and it did not change substantially or systematically throughout the treatment period.

Example 4: Treatment of Cats with a DF-PFM-ExR Collar—Efficacy

An efficacy study was conducted in a group of animals (cats) for over 180 days, 12 animals (experimental) wore a DF-PFM-ExR collar, produced with formulation XIII as described in Example 1, and 6 animals (control) wore a placebo collar. All animals (experimental and control) were infested with between 50 and 60 each of fleas and ticks at day 0. The experimental animals were re-infested respectively with 50 more fleas and 50 more ticks at each of days 30, 60, 90, 120 and 150. All animals (experimental and control) were checked for the presence of parasites after 72 hours (3 days), 14 days, 33 days, 63 days, 93 days, 123 days, 153 days and 180 days.

The results showed that efficacy of the DF-PFM-ExR collars in cats was at or near 100% throughout the 180-day period. The experimental animals had no fleas or ticks 72 hours and 14 days post collar. At 33 days, 63 days, 93 days, 123 days, and 153 days post collar, the experimental animals had between 0 and 2 fleas, with a mean of less than one flea, as well as between 0 and 2 ticks, with a mean of less than one ticks. At 180 days post collar, the experimental animals had between 0 and 2 fleas with a mean of one flea, and between 0 and 2 ticks with a mean of 0.88 ticks.

The efficacy of the PFM-ExR collar did not lessen with time and throughout the experimental period of 180 days it was fully effective. Therefore, it can reasonably be concluded that the DF-PFM-ExR collar will remain effective for a substantially longer amount of time, beyond the 180-day period, and at least up to 240 days and up to a year. There were no adverse reactions presented by any of the animals treated with the PFM-ExR collar.

By contrast, all 6 control animals, similarly infested with fleas and ticks, started at day 0 with a range of between 51 to 65 fleas and between 51 to 57 ticks per animal, which continued throughout the whole experimental period, with stochastic increases and decrease within the range. By way of example, at 153 days post infestation, the animals had between 44 to 57 fleas and between 32 to 57 ticks.

These experiments were performed in groups of male and female animals of a range of body weight from 6.9 kg to 7.3 kg, from 4.6 kg to 5.2 kg and from 1.2 kg to 2.85 kg, as well as in young and mature animals. Body weight and fur length did not change substantially or systematically throughout the experimental period for both experimental and control groups.

Example 5: Treatment of Cats with a DF-PFM-ExR—Safety

A safety study was conducted for collars produced using formulation XIII as described in Example 1, in cats for 30 days. The animals were treated with an increasing amount of active components, provided in the form of one collar on day 1, two collars on day 4, three collars on day 7, four collars on day 10, and five collars on day 13. No adverse health reactions were observed.

There is therefore provided in accordance with an embodiment of the disclosure, a plastic material comprising a polyethylene-comprising polymer, a plasticizer, and at least one insecticide as an active component, wherein the plastic material is formulated to release the at least one insecticide through an outer surface of the plastic material at an effective rate for a period of at least a week. Optionally, the plastic material is formulated to release the at least one insecticide through an outer surface of the plastic material at an effective insecticidal rate for a period of at least a month. Optionally, the plastic material is formulated to release the at least one insecticide through an outer surface of the plastic material at an effective insecticidal rate for a period of at least six months.

In an embodiment of the disclosure, the plastic material comprises a porous material impregnated with the at least one insecticide. Optionally, the porous material comprises one or a combination of two or more selected from the group consisting of: a porous polymer; a silica gel, a fumed silica, a carbon black and an activated charcoal. Optionally, the porous material is embedded within the structural polymer in a granular form.

In an embodiment of the disclosure, the polyethylene-comprising polymer comprises one or a combination or two or more selected from: a high density polyethylene, a low density polyethylene, a linear low density polyethylene, and a polyethylene-based polyolefin elastomer. Optionally, the polyethylene-comprising polymer comprises a combination of a polyethylene-based polyolefin elastomer and a low density polyethylene. Optionally, the polyethylene-comprising polymer consists of a combination of a polyethylene-based polyolefin elastomer and a low density polyethylene.

In an embodiment of the disclosure, the plastic material comprises a volatile oil. Optionally, the volatile oil is comprised as a component of an essential oil.

In an embodiment of the disclosure, the plasticizer is a primary plasticizer. Optionally, the primary plasticizer is selected from the group consisting of: a dioctyl terephthalate (DOTP), a diisononyl phthalate (DINP a triacetin, a benzoate ester, a trimethyl pentanyl diisobutyrate (TXIB), and a propylene carbonate.

In an embodiment of the disclosure, the plasticizer is a secondary plasticizer. Optionally, the secondary plasticizer is selected from the group consisting of: a chlorinated paraffin, a naphtenic hydrocarbon, an aliphatic hydrocarbon, or an epoxidized triglyceride. Optionally, the epoxidized triglyceride is an epoxidized plant-derived oil. Optionally, the epoxidized plant-derived oil is an epoxidized soybean oil, an epoxidized palm oil, an epoxidized canola oil, an epoxidized linseed oil, or an epoxidized sunflower oil.

In an embodiment of the disclosure, the at least one insecticide is one of or a combination of two or more of: dinotefuran, flumethrin, indoxacarb, imidacloprid, and Amitraz. Optionally, at least one insecticide in the formulation comprises dinotefuran. Optionally, the dinotefuran is between 10-15% of the total formulation by weight. Optionally, the at least one insecticide in the formulation comprises flumethrin. Optionally, the flumethrin is between 2-5% of the total formulation by weight. Optionally, the at least one insecticide in the formulation comprises indoxacarb. Optionally, the indoxacarb is between 9-15% of the total formulation by weight.

In an embodiment of the disclosure, the secondary plasticizer comprises an epoxydized triglyceride and the at least one insecticide comprises a combination of dinotefuran and flumethrin. Optionally, the polyethylene-comprising polymer comprises a combination of a polyethylene-based polyolefin elastomer and a low density polyethylene.

There is also provided a wearable device comprising a plastic material in accordance with an embodiment of the disclosure. There is also provided a method of treating a non-human animal suffering from ectoparasite infestation, the method comprising attaching the wearable device.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A plastic material comprising a polyethylene-comprising polymer, a polar plasticizer selected from the group consisting of: a chlorinated paraffin, a naphthenic hydrocarbon, an aliphatic hydrocarbon, and an epoxidized triglyceride; and at least one insecticide as an active component, wherein the plastic material comprises a porous material impregnated with the at least one insecticide, wherein the porous material is embedded within the structural polymer in a granular form, and wherein the plastic material is formulated to release the at least one insecticide through an outer surface of the plastic material at an effective rate for a period of at least a week.

2. The plastic material according to claim 1 wherein the plastic material is formulated to release the at least one insecticide through an outer surface of the plastic material at an effective insecticidal rate for a period of at least a month.

3. The plastic material according to claim 1 wherein the plastic material is formulated to release the at least one insecticide through an outer surface of the plastic material at an effective insecticidal rate for a period of at least six months.

4. The plastic material according to claim 1, wherein the porous material comprises one or a combination of two or more selected from the group consisting of: a porous polymer; a silica gel, a fumed silica, a carbon black and an activated charcoal.

5. The plastic material according to claim 1, wherein the polyethylene- comprising polymer comprises one or a combination or two or more selected from: a high density polyethylene, a low density polyethylene, a linear low density polyethylene, and a polyethylene-based polyolefin elastomer.

6. The plastic material according to claim 5, wherein the polyethylene- comprising polymer comprises a combination of a polyethylene-based polyolefin elastomer and a low density polyethylene.

7. The plastic material according to claim 1, wherein the epoxidized triglyceride is an epoxidized plant-derived oil, selected from the group consisting of: epoxidized soybean oil, an epoxidized palm oil, an epoxidized canola oil, an epoxidized linseed oil, or an epoxidized sunflower oil.

8. The plastic material according to claim 1, wherein the at least one insecticide is one of or a combination of two or more of: dinotefuran, flumethrin, indoxacarb, imidacloprid, or Amitraz.

9. The plastic material according to claim 8, wherein the at least one insecticide in the formulation comprises dinotefuran at a range between 10-15% of the total formulation by weight.

10. The plastic material according to claim 8, wherein the at least one insecticide in the formulation comprises flumethrin at a range between 2-5% of the total formulation by weight.

11. The plastic material according to claim 8, wherein the at least one insecticide in the formulation comprises indoxacarb at a range between 9-15% of thetotal formulation by weight.

12. The plastic material according to claim 1, wherein the plasticizer comprises an epoxidized triglyceride and the at least one insecticide comprises a combination of dinotefuran and flumethrin.

13. A wearable device comprising the plastic material according to claim 1.

14. A method of treating a non-human animal suffering from ectoparasite infestation, the method comprising attaching a wearable device according to claim 13 to the non-human animal.

* * * * *